US012508931B2

(12) United States Patent
Kydd (10) Patent No.: US 12,508,931 B2
(45) Date of Patent: Dec. 30, 2025

(54) SOLAR-ENERGIZED ELECTRIC VEHICLE CHARGING (71) Applicant: NetZero V2G Technologies LLC, Fort Washington, PA (US)

(72) Inventor: Paul Harriman Kydd, Lawrenceville, NJ (US)

(73) Assignee: NETZERO V2G TECHNOLOGIES LLC, Fort Washington, PA (US)

( * ) Notice: Subject to any disclaimer, the term of this patent is extended or adjusted under 35 U.S.C. 154(b) by 0 days.

(21) Appl. No.: 17/333,236

(22) Filed: May 28, 2021

(65) Prior Publication Data
US 2022/0379763 A1 Dec. 1, 2022

(51) Int. Cl.
B60L 53/51 (2019.01)
B60L 53/64 (2019.01)
B60L 53/68 (2019.01)

(52) U.S. Cl.
CPC ............... B60L 53/51 (2019.02); B60L 53/64 (2019.02); B60L 53/68 (2019.02); B60L 2210/40 (2013.01)

(58) Field of Classification Search
CPC .......... B60L 53/51; B60L 53/64; B60L 53/68; B60L 2210/40
See application file for complete search history.

(56) References Cited

U.S. PATENT DOCUMENTS

| 6,847,937 | B1 | 1/2005 | Savage et al. |
| 7,582,979 | B2 | 9/2009 | Oyobe et al. |
| 8,227,937 | B2 | 7/2012 | Barlock et al. |
| 8,278,881 | B2 | 10/2012 | Woody et al. |
| 8,463,449 | B2 | 6/2013 | Sanders |
| 8,509,976 | B2 | 8/2013 | Kempton |
| 8,575,780 | B2 | 11/2013 | Moon |
| 8,599,587 | B2 | 12/2013 | Chapman et al. |
| 8,716,891 | B2 | 5/2014 | Choi |
| 8,768,533 | B2 | 7/2014 | Ichikawa |
| 8,772,961 | B2 | 7/2014 | Ichikawa |
| 8,957,547 | B2 | 2/2015 | Chang et al. |
| 9,263,895 | B2 | 2/2016 | Naiknaware et al. |
| 9,276,410 | B2 | 3/2016 | Binder et al. |

(Continued)

OTHER PUBLICATIONS

Beck, Leonard J.; V2G: a text about vehicle-to-grid, the technology which enables a future of clean and efficient electric-powered transportation; 2009—Trzy updated Jul. 2, 2009, Leonard Beck, c2009, Newark, Del., USA.

(Continued)

Primary Examiner — Julian D Huffman
Assistant Examiner — Johali A Torres Ruiz
(74) Attorney, Agent, or Firm — Bergman LLC; Michael Bergman (57) ABSTRACT This invention embodies a system and a method for charging electric vehicles comprising, a solar canopy over selected parking spaces, and control equipment and software to maximize the use of solar energy, minimize demand charges and allow for ancillary services to the grid. The capacity of the solar canopy is such that it is capable of providing the energy needed to operate the vehicle both for commuting and for all other uses except for trips over 2-300 miles, as provided by the control software. The system can include features for allowing access only to authorized users, for measuring the amount of energy used by each, and for monthly billing.

13 Claims, 4 Drawing Sheets

(56) References Cited

U.S. PATENT DOCUMENTS

| | | | |
|---|---|---|---|
| 9,293,948 B2 | 3/2016 | Freitas et al. | |
| 9,436,179 B1 | 9/2016 | Turney et al. | |
| 9,481,259 B2 | 11/2016 | Choi et al. | |
| 9,520,623 B2 | 12/2016 | Honma et al. | |
| 9,573,478 B2 | 2/2017 | Jefferies et al. | |
| 9,577,291 B2 | 2/2017 | Kolavennu et al. | |
| 9,584,047 B2 | 2/2017 | Frohman et al. | |
| 9,705,333 B2 | 7/2017 | Clifton | |
| 9,754,300 B2 | 9/2017 | Kempton et al. | |
| 9,758,046 B2 | 9/2017 | Harper et al. | |
| 9,783,068 B2 | 10/2017 | Eger et al. | |
| 9,796,258 B1 | 10/2017 | Bundschuh et al. | |
| 9,821,669 B2 | 11/2017 | Tanabe | |
| 9,845,021 B2 | 12/2017 | Yang et al. | |
| 9,852,481 B1 | 12/2017 | Turney et al. | |
| 9,862,287 B2 | 1/2018 | Tang et al. | |
| 9,948,101 B2 | 4/2018 | Chow | |
| 9,987,941 B2 | 6/2018 | Miftakhov et al. | |
| 10,007,259 B2 | 6/2018 | Turney et al. | |
| 10,126,796 B2 | 11/2018 | Dorn et al. | |
| 10,137,796 B2 | 11/2018 | Huang et al. | |
| 10,140,670 B2 | 11/2018 | Gow | |
| 10,166,877 B2 | 1/2019 | Zeng et al. | |
| 10,166,882 B2 | 1/2019 | Yang et al. | |
| 10,173,543 B2 | 1/2019 | Yang et al. | |
| 10,186,865 B2 | 1/2019 | Chiang et al. | |
| 10,333,306 B2 | 6/2019 | Hooshmand et al. | |
| 10,333,307 B2 | 6/2019 | Hooshmand et al. | |
| 10,439,428 B2 | 10/2019 | Kydd | |
| 10,693,315 B2 | 6/2020 | Kydd | |
| 10,873,210 B2 | 12/2020 | Lowenthal et al. | |
| 10,913,370 B2 | 2/2021 | Kubota et al. | |
| 11,043,835 B2 | 6/2021 | Kydd | |
| 11,264,843 B1* | 3/2022 | Lim | H02J 50/12 |
| 2003/0205936 A1 | 11/2003 | Beckerman et al. | |
| 2007/0043478 A1 | 2/2007 | Ehlers et al. | |
| 2008/0111424 A1 | 5/2008 | Yeh | |
| 2009/0179495 A1 | 7/2009 | Yeh | |
| 2010/0019577 A1 | 1/2010 | Barlock et al. | |
| 2011/0133693 A1 | 6/2011 | Lowenthal et al. | |
| 2011/0169447 A1 | 7/2011 | Brown | |
| 2011/0202192 A1 | 8/2011 | Kempton | |
| 2011/0202217 A1 | 8/2011 | Kempton | |
| 2011/0202401 A1 | 8/2011 | Kempton et al. | |
| 2011/0202418 A1* | 8/2011 | Kempton | B60L 53/63 705/26.1 |
| 2011/0204851 A1 | 8/2011 | Manotas, Jr. | |
| 2011/0245987 A1 | 10/2011 | Pratt et al. | |
| 2012/0032636 A1 | 2/2012 | Bianco | |
| 2012/0106672 A1 | 5/2012 | Shelton et al. | |
| 2012/0223675 A1 | 9/2012 | Bianco | |
| 2012/0267952 A1 | 10/2012 | Ballatine et al. | |
| 2013/0020873 A1 | 1/2013 | Barlock et al. | |
| 2013/0080254 A1* | 3/2013 | Thramann | B60L 53/68 705/14.57 |
| 2013/0124005 A1 | 5/2013 | Ichikawa | |
| 2013/0141040 A1 | 6/2013 | DeBoer et al. | |
| 2013/0313243 A1 | 11/2013 | Gonze et al. | |
| 2013/0328527 A1 | 12/2013 | Kang | |
| 2014/0062401 A1* | 3/2014 | Gadh | B60L 53/67 320/109 |
| 2014/0067140 A1 | 3/2014 | Gow | |
| 2014/0277788 A1 | 9/2014 | Forbes, Jr. | |
| 2015/0015213 A1 | 1/2015 | Brooks et al. | |
| 2015/0097527 A1 | 4/2015 | DeDona et al. | |
| 2015/0326012 A1* | 11/2015 | Tsuchiya | H02J 3/381 307/20 |
| 2016/0006245 A1 | 1/2016 | Chow | |
| 2016/0137082 A1 | 5/2016 | Jefferies et al. | |
| 2016/0137087 A1 | 5/2016 | Haas et al. | |
| 2016/0137149 A1 | 5/2016 | Kamachi et al. | |
| 2016/0207409 A1 | 7/2016 | Ueo | |
| 2016/0211676 A1 | 7/2016 | Chiang et al. | |
| 2016/0294022 A1* | 10/2016 | Thramann | B60L 53/65 |
| 2017/0129356 A1* | 5/2017 | Johnson | B60L 53/63 |
| 2017/0155253 A1 | 6/2017 | Veda et al. | |
| 2017/0168516 A1 | 6/2017 | King | |
| 2017/0366039 A1* | 12/2017 | Qin | H02J 7/0042 |
| 2018/0018007 A1 | 1/2018 | Dorn et al. | |
| 2018/0037121 A1 | 2/2018 | Narla | |
| 2018/0090935 A1 | 3/2018 | Asghari et al. | |
| 2018/0105052 A1 | 4/2018 | Patil et al. | |
| 2018/0244170 A1* | 8/2018 | Kydd | H02J 7/35 |
| 2019/0036341 A1 | 1/2019 | Asghari et al. | |
| 2019/0056451 A1 | 2/2019 | Asghari et al. | |
| 2019/0079473 A1 | 3/2019 | Kumar et al. | |
| 2019/0131923 A1 | 5/2019 | Hooshmand et al. | |
| 2019/0137956 A1 | 5/2019 | Hooshmand et al. | |
| 2019/0140465 A1 | 5/2019 | Hooshmand et al. | |
| 2019/0147552 A1 | 5/2019 | Nakayama et al. | |
| 2019/0148945 A1 | 5/2019 | Nakayama et al. | |
| 2019/0206000 A1 | 7/2019 | ElBsat et al. | |
| 2019/0288347 A1 | 9/2019 | Yokoyama et al. | |
| 2019/0322178 A1 | 10/2019 | Sturza et al. | |
| 2019/0369166 A1 | 12/2019 | Moslemi et al. | |
| 2020/0031238 A1 | 1/2020 | Kydd | |
| 2020/0062136 A1* | 2/2020 | McCalmont | H02J 7/0013 |
| 2020/0067400 A1 | 2/2020 | Li et al. | |
| 2020/0101850 A1 | 4/2020 | Harty et al. | |
| 2020/0406771 A1* | 12/2020 | Okumura | H02J 3/381 |
| 2021/0273453 A1 | 9/2021 | Nisho et al. | |
| 2021/0291670 A1 | 9/2021 | Kaufman et al. | |
| 2022/0190639 A1 | 6/2022 | Nelson et al. | |
| 2022/0250498 A1 | 8/2022 | Okada et al. | |

OTHER PUBLICATIONS

SAE International; SAE Electric Vehicle and Plug in Hybrid Electric Vehicle Conductive Charge Coupler; J1772 Oct. 2012; Issued Oct. 1996; Revised Oct. 2012.

Kristian, Maggie; Great Plains Institute; Pilot Project Gets Solar Panels in Sync with Electric Vehicle Chargers; Jan. 9, 2020; https://betterenergy.org/blog/solar-synchronization-electric-vehicle-chargers/.

Trabish, Herman; Utility Dive; Utilities in hot water: Reqalizing the benefits of grid-integrated water heaters; Jun. 20, 2017; https://www.utilitydive.com/news/utilities-in-hot-water-realizing-the-benefits-of-grid-integrated-water-hea/445241/.

Open vs. Closed Charging Stations: Advantages and Disadvantages; Open Charge Alliance; Aug. 8, 2018; https://www.openchargealliance.org/uploads/files/OCA-Open-Standards-White-Paper-compressed.pdf.

File History for U.S. Appl. No. 14/101,423 as accessed from U.S. Patent and Trademark Office.

File History for U.S. Appl. No. 15/441,484 as accessed from U.S. Patent and Trademark Office.

File History for U.S. Appl. No. 16/055,972 as accessed from U.S. Patent and Trademark Office.

File History for U.S. Appl. No. 16/562,565 as accessed from U.S. Patent and Trademark Office.

File History for U.S. Appl. No. 16/580,663 as accessed from U.S. Patent and Trademark Office Patent Center System on May 7, 2025.

File History for U.S. Appl. No. 16/563,108 as accessed from U.S. Patent and Trademark Office Patent Center System on May 7, 2025.

File History for U.S. Appl. No. 17/248,576 as accessed from U.S. Patent and Trademark Office Patent Center System on May 7, 2025.

File History for U.S. Appl. No. 17/330,662 as accessed from U.S. Patent and Trademark Office Patent Center System on May 7, 2025.

* cited by examiner

SOLAR-ENERGIZED ELECTRIC VEHICLE CHARGING

CROSS-REFERENCES TO RELATED APPLICATIONS

This application is related to U.S. patent application "Vehicle-Solar-Grid Integration" Ser. No. 14/101,423 filed Dec. 10, 2013, now issued as U.S. Pat. No. 9,566,867, Feb. 14, 2017, by the present inventor, and Provisional Patent Applications "Bidirectional Power Electronic Interface" No. 61/889,067, filed Oct. 10, 2013, "Bidirectional Power Electronic Interface with Sustaining Power" 61/921,583, filed Dec. 30, 2013, "Vehicle-Solar-Grid Integration with Supplementary Battery" 62/050,819, filed Sep. 16, 2014, "Low-Cost EVPV for Vehicle-Solar-Grid Integration" 62/297,462, filed Feb. 19, 2016, "Minimum Cost EVPV for Vehicle-Solar-Grid Integration" 62/299,756, filed Feb. 25, 2016, now issued as U.S. Pat. No. 10,439,428, Oct. 8, 2019, and a companion filing "Method of Using Minimum Cost EVPV for Vehicle-Solar-Grid Integration" Ser. No. 16/562,565, Sep. 3, 2019, now allowed as a US patent, "Vehicle-Solar-Grid Integration for Back up Power" 62/465,424 filed Mar. 1, 2017 now filed as non provisional patent application Ser. No. 16/044,683, "Non Grid-Tied Vehicle-Solar Uninterruptable Power System" 62/544,041, filed Aug. 11, 2017, now issued as U.S. Pat. No. 10,693,315, Jun. 23, 2020, and "Demand Charge Management by Electric Vehicles", 62/721,216, filed Aug. 22, 2018, and now filed as "Minimum Cost Demand Charge Management by Electric Vehicles" non provisional patent application Ser. No. 16/563,108, Sep. 6, 2019, patent application "Electric Vehicle Service Equipment Adapter Module to Control Added Loads", Ser. No. 16/580,663, Sep. 24, 2019, Provisional Patent Application 62/978,381, "Optimum Utilization of Electric Circuit Capacity by Adding Electric Vehicle Charging", filed Feb. 19, 2020, now filed as patent application Ser. No. 17/248,576, Jan. 29, 2021, provisional Patent Application 63/116,516 "Solar-Energized Workplace Electric Vehicle Charging" filed Nov. 20, 2020, and patent application Ser. No. 17/730,666, "Bidirectional AC V2G for Multifamily/Workplace Electric Vehicle Charging" filed May 26, 2021 by the present inventor, and "Multiple Load Micro-Grid Implementation of Vehicle-Solar-Grid Integration" 62/320,701, filed Apr. 11, 2016, by the present inventor and Brian R. Hamilton of Cranbury, NJ, and Chris A. Martin of Media, PA

FEDERALLY SPONSORED RESEARCH

None

CITED LITERATURE

1. Maggie Kristian, Betterenergy.org/blog/solar-synchronization-electric-vehicle-charging, Parts 1-4, Jan. 9, 2020.
2. Description of Open Charge Point Protocol (OCPP) openchargealliance.org
3. SAE Surface Vehicle Recommended Practice, J-1772 SAE Electric Vehicle Conductive Charge Coupler, revised October 2012.

PATENT LITERATURE

1. Provisional Patent Application 62/978,381, "Optimum Utilization of Electric Circuit Capacity by Adding Electric Vehicle Charging", Paul H. Kydd, filed Feb. 19, 2020.
2. Patent Application 2013/0127,393, May 23, 2013, "Solar Station for Charging Electric Vehicles", and U.S. Pat. No. 9,236,637, Same title, same inventor, Santos Silva Serra Duarte.
3. Patent Application 2015/0306,970", Oct. 29, 2015, Energy Management Method and Energy Management System Using Same", M. Son.
4. Provisional Patent Application 63/116,516 "Solar-Energized Workplace Electric Vehicle Charging" filed Nov. 20, 2020, By the present inventor, from which I am claiming priority, which is substantially identical to the present application except that the present application is extended to multifamily residences as well as workplaces.

FIELD OF THE INVENTION

The present disclosure describes a system and method for Electric Vehicle (EV) charging that allows vehicles to be recharged with locally generated solar energy. It is a method for controlling the rate of charging of EVs to match the availability of solar electric energy. The rate of charging is further controlled to minimize spikes in demand and related demand charges. The rate of charging may be further modulated to provide frequency regulation service to the grid. The availability of EVs with true bidirectional charging capability will allow extension of this system to enable EVs to provide back up power, high level frequency regulation, demand response services, and black start capabilities, indeed all of the capabilities of solar plus stationary storage battery installations.

BACKGROUND OF THE INVENTION

Electric Vehicles (EVs) rely on very large on board storage batteries ranging currently in capacity from 24 to over 80 kilowatt-hours (kWh) to provide an electric range from 100 to over 300 miles on a single charge. As the EV market matures and batteries become cheaper, battery capacity and range keep increasing. This increase in EV range presents an opportunity for Urban EV owners who do not have convenient access to electric power at home to charge their vehicles at work, not only for their daily commute but for all of their needs, except for trips over 300 miles.

It also presents an opportunity for employers to offer recharging facilities to their employees, either as an amenity or as a profit making addition to their facilities. This addition does not come for free however. It is likely to involve additional investment in electric power supply to support the EV charging facilities, and will certainly increase the electric energy bill of the facility.

It is also likely to increase the demand charge associated with the additional demand for energy. Commercial and Industrial electric suppliers bill their clients for the energy consumed in kilowatt-hours (kWh) each month, and for the peak demand in kilowatts (kW). The latter represents the necessary return on the investment in transmission and distribution equipment, which has to be sized to deliver the peak load. The demand charge each month typically amounts to roughly the same as the cost of the energy transmitted, and serves as a powerful incentive to present a constant load and avoid peaks in demand.

EV charging represents a major new load on the electric energy supply grid that can be a source of revenue to the electric utilities and to employers or multifamily landlords offering it, and a very economical source of energy for personal transportation. Uncontrolled, however, this load can be a major problem. If every workplace EV plugs in and begins to recharge at full power at 8 AM, it can aggravate the peak load on the entire electric grid system from generation through transmission to distribution, which is already peaking at that hour, resulting in high-cost energy due to high wholesale prices, and increased demand charges by the distribution companies.

This problem can be controlled due to the flexibility of EV charging. Because it doesn't matter when the EV is charged, as long as it is ready to go when needed, it is possible to allow the EV driver to plug in at 8 AM but delay the bulk of the actual charging until later morning hours when solar electric energy is available.

Workplace EV charging and solar energy, generated using the area already devoted to vehicle parking, is a natural combination, facilitated by the increasing battery capacity of the vehicles. Solar energy, obviously, is available during the day when commuter EVs are parked. A typical parking space is 10 ft. wide and 20 ft. long for a total of 200 ft$^2$. Modern 400-Watt solar panels deliver 18.3 Watts per ft$^2$ or 3,660 Watts for a typical parking space.

Almost everywhere in the US a solar array will deliver at least one kWh per year per Watt of rated capacity. In Philadelphia, PA at 40° N latitude, the figure is 1.18 kWh per Watt. In CA, AZ and FL it is 20-25% more). A solar canopy covering an average parking space can provide enough energy to propel an EV with a consumption of 0.25 kWh per mile for more than 12,000 miles, the distance the average light duty vehicle is driven annually in the US.

The problem is that solar energy peaks at mid-day in the summer and is much less at the ends of the day and in the winter. The solution is managed charging, which is the subject of this invention. Managed charging is enabled by the communication functions of the Internet and the wireless telephone infrastructure underlying the "Internet of Things". Individual devices can be aggregated and controlled via the Internet "cloud" providing data handling and reporting functions. The devices in this case are Electric Vehicle Service Equipments (EVSEs) which link the electric power available from the grid, typically as 240 V, single-phase Alternating Current (AC), to the on-board charger on the EV via a flexible cable and plug. The design and operating details of the EVSE and plug are specified in SAE Standard J-1772[1].

[1] SAE Surface Vehicle Recommended Practice, J-1772 SAE Electric Vehicle Conductive Charge Coupler, revised October 2012.

There is an opportunity to increase the efficiency with which electric energy is utilized still further by grouping EVSEs together while limiting the amount of power in kW that the group can draw. Grouping is a feature that several EVSE network suppliers offer. It operates by networking a specified group of EVSEs over the Internet so that cloud-resident software can limit the amount of power drawn by the group to a specified amount, and distribute this amount evenly to the EVSEs in the group.

To provide recharging energy during cloudy winter days when there is no solar energy the EVSEs need to be connected to the grid, preferably via the electric service of an adjacent building. During periods of low solar generation the EVs will be supplied with a minimum amount of grid energy at mid-day following the morning peak in building demand to provide the required range while minimizing demand charges. During summer afternoons when the EVs have been fully charged, excess solar energy will be available to offset other building loads and minimize demand charges. Over the course of an entire year the entire energy bill for charging EVs is met with solar energy via this net metering, which for large buildings with heavy conventional loads will be entirely behind the meter.

To maximize the utilization of solar energy and minimize the reliance on grid energy "solar sequencing" can be implemented using the same remote control and grouping features used for demand charge control. The demand from the EVSEs can be matched to the availability of energy from the solar canopy to achieve adequate EV charging using a maximum of solar energy and a minimum of grid energy. The Great Plains Institute has done an extensive study of this mode of operation based on conditions in Minneapolis, MN, described in reference 1[2]. They have found it to be feasible in an environment not very favorable to solar.

[2] Maggie Kristian, Betterenergy.org/blog/solar-synchronization-electric-vehicle-charging, Parts 1-4, Jan. 9, 2020.

To avoid an increase in demand charges the source-building load can be monitored continually. Any additional load imposed by EV charging, which is not offset by solar energy, can be satisfied at times when the building load is below the expected demand charge limit for the month to level the load without increasing demand charge. In this way the extra energy needed is obtained at the cost of the energy only, and can be offset by export of energy at times of solar excess at the same price.

Finally, the same control features can be used to modulate the demand from the EVSE group from second to second to accommodate the needs of the grid so that the solar canopy can provide extra energy to the building and reduce load on the grid when generation is short, and the EVSE group can accept increased energy input when the grid is in excess. This is a valuable service to the grid that can be compensated when enough modulated capacity is aggregated, typically 100 kW in the PJM service territory.

Thus modern technology for remote control and grouping of EVSEs makes possible the provision of an EV charging system that derives virtually all of its energy from a solar canopy, covering just the real estate already devoted to parking, with minimum and possibly favorable impact on demand charges. Ultimately the same technology can deliver valuable ancillary services to the grid. That system and the method of operating it is the subject of this invention.

BRIEF SUMMARY OF THE INVENTION

The objectives of this invention are achieved by a system adjacent to a building or other source of electric energy having one or more solar canopies preferentially located over parking spaces, with an area approximately equal to the parking spaces covered, and capable of generating an amount of electrical energy equal to the needs of the electric vehicles parked under it on an annual basis. The electric energy is inverted from DC to AC and metered to establish the amount of solar energy generated. Part of the energy is diverted to a series of Electric Vehicle Service Equipments to charge the parked EVs. Any excess solar energy is directed to the building supply via a net meter. In case the solar energy is inadequate for minimal EV charging, energy is taken from the building supply to provide it. Over the course of a year the net meter should read approximately zero, but it is used to control the system and keeps track of the net energy supply to or from the building from month to month if needed for billing.

The EVSEs are controlled to accomplish the objectives of this invention remotely over the Internet using remote control protocols such as OCPP[3]. These allow individual EVSEs to be turned on and off, and their output can be modulated for proportional control. A hierarchy of commands is planned to accomplish the various objectives of this invention:

[3] Description of Open Charge Point Protocol (OCPP) openchargealliance.org

1. To accomplish solar sequencing the EVSEs fed by a single inverter will be grouped and energized to consume whatever solar energy is available, maintaining the net meter output as close to zero as possible.
2. To accomplish demand charge management the EVSE output will be minimized at times of high building demand measured by a meter on the building supply while still providing sufficient recharge to give the EVs the required range.
3. To accomplish ancillary services the EVSE outputs will be modulated from second to second in response to demands from the grid Independent System Operator. Response to other emergencies such as Demand Response Events and outages is possible with EV s that are capable of bidirectional DC charging.

BRIEF DESCRIPTION OF THE DRAWINGS

[4] Provisional Patent Application 62/978,381, "Optimum Utilization of Electric Circuit Capacity by Adding Electric Vehicle Charging", Paul H. Kydd, filed Feb. 19, 2020.

DETAILED DESCRIPTION OF THE INVENTION: THE PREFERRED EMBODIMENT

Figure 1:
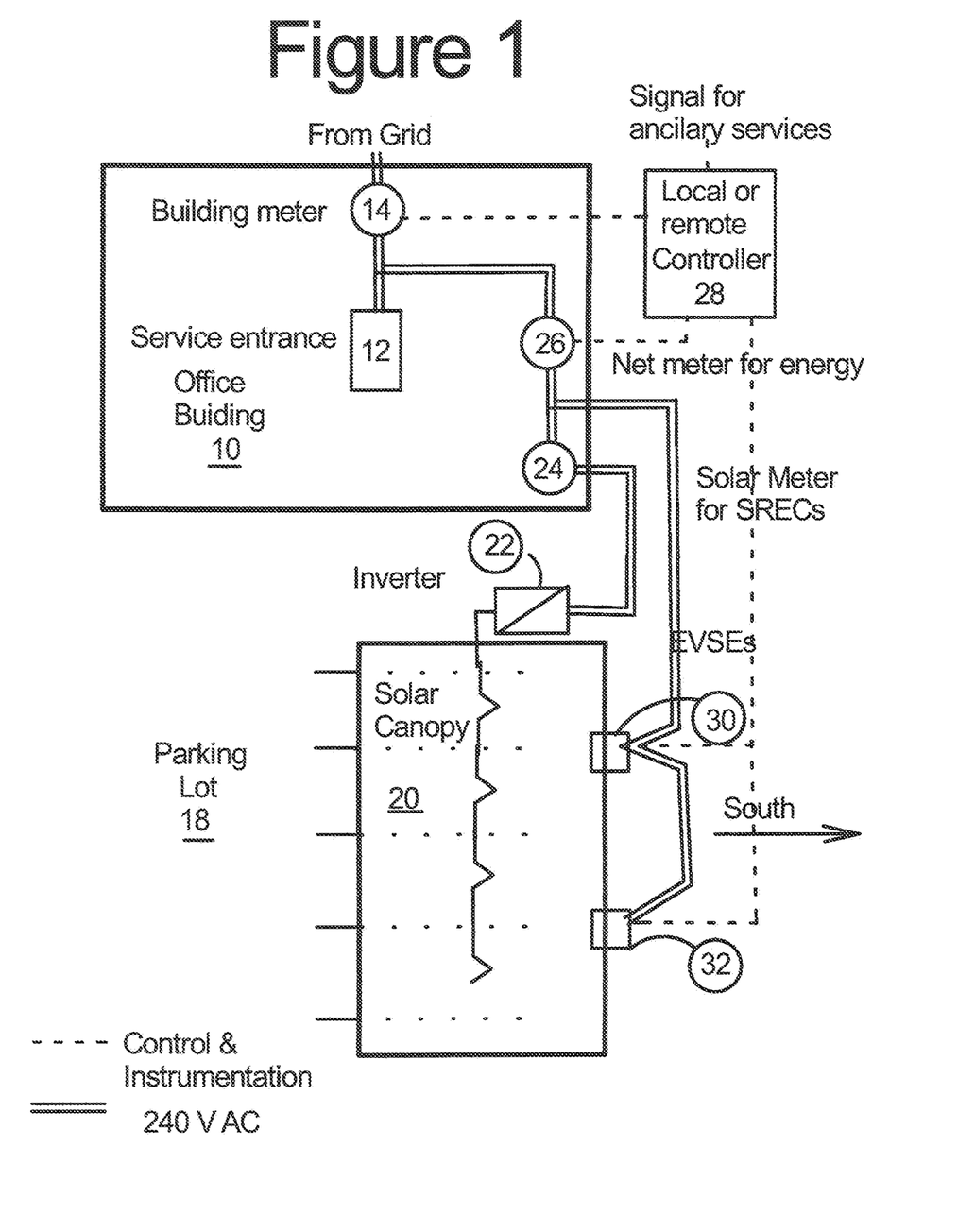
FIG. 1 is a schematic diagram showing the system of this invention applied to a building with a metered electric energy supply.

FIG. 1 shows an office building 10 with electric distribution panel 12 supplied with electric energy from the electric grid through building meter 14. Meter 14 ideally should be able to report building electric demand on at least 15-minute intervals. Adjacent South-facing parking lot 18 is equipped with solar canopy 20. Canopy 20 generates DC electricity, which is inverted to useable AC energy by inverter 22 in an amount approximately equal to the demand for energy of the electric vehicles parked under the canopy. The output of inverter 22 is monitored by meter 24 to determine the total renewable energy generated by canopy 20 for Solar Renewable Energy Certificate (SREC) income. The solar output goes preferentially to a group of Electric Vehicle Service Equipments (EVSE)s represented schematically by double units 30 and 32. Any excess solar energy from canopy 20 is supplied to building 10 through net meter 26. Any deficiency in the energy required for EVSEs 30 and 32 is made up by grid energy extracted downstream of meter 14, which is allocated by controller 28 and measured by net meter 26. In winter net meter 26 will record net deliveries to the EVSEs. In summer net meter 26 will record net deliveries to building 10. Over an entire year the net transfer of energy from service entrance 12 will be approximately zero, if EVSEs 30 and 32 are fully occupied by electric vehicles, which get most of their energy from this connection.

Controller 28 can be a microcontroller linked by control circuitry to meter 14 to sense building demand, to net meter 26 to sense solar availability, and to EVSEs 30, 32 to control their output. In addition there is a connection to a remote control location, which transmits grid controls for ancillary services and details of the use of each EVSE for monthly billing of EV drivers for the use of the recharging service. Controller 28 itself can be located remotely in the cloud as a software suite receiving inputs and delivering output commands over the internet via either a WiFi connection or a cellular phone connection.

The functions of controller 28 are to:
1. Sense the presence of an EV driver wishing to charge at any of the available EVSEs and verify the driver's qualification as an approved user.
2. Determine the minimum amount of energy needed for each EV.
3. Allocate that amount over the working day.
4. Transmit the amount of energy delivered for billing purposes
5. Minimize the use of grid energy to satisfy EV load by controlling charging rate of EVSEs 30, 32 to maximize the use of solar energy expected from canopy 20
6. Minimize the demand charge on building 10 by monitoring building load via meter 14 and controlling EVSEs to operate only below historic peak demand where possible.
7. Accept commands from the grid ISO for modulation of charging load in compliance with a signal for ancillary Frequency Regulation services.

EVSEs 30, 32 are assumed to be compliant with the SAE 1-1772 protocol for electric vehicle charging equipment. EVSEs increasingly are also compliant with the Open Charge Point Protocol (OCPP.16), which governs communications between the EVSE and remote controls and data logging over the Internet. There are networks designed to enable control of large numbers of EVSEs remotely over the Internet One such is the JuiceNet maintained by ENEL-X Emobility.

As an example of remote control capability, the JuiceNet collects data from each EVSE connected to it, stores this data in the cloud and can make it available both to an individual user through WiFi or a phone app, and to an aggregator of a number of EVSEs. The phone app can also be used with ENEL software called "Enterprise" to allow charging for approved users. The users are registered as authorized to charge by the aggregator in concert with the employer or landlord, perhaps with an agreement to pay a certain amount for the privilege. They can then sign in by reading the QR code on the EVSE or EVSEs they are authorized to use. Some systems also permit the use of RFID cards for authorization. The amount of energy used is stored in the cloud under the users account and can be used by the aggregator or employer for monthly billing purposes. Individual requirements for added range during the day can be accommodated, and special requirements in advance of a trip can be entered by phone and accommodated by modifying the charging profile for the month or for the day.

For optimization purposes the JuiceNet and similar networks offer remote control features that allow an aggregator to control all of the EVSEs to accomplish certain objectives. This control is facilitated by "Grouping" software by which EVSEs can be grouped together and the power level of the group can be limited to the anticipated capacity of the supply. For example, the aggregator can send controls to each EVSE to limit the level of charging to match the availability of solar energy known as "solar-sequencing" and described in Reference 1, post 2[5].

[5] Maggie Kristian, Betterenergy.org/blog/solar-synchronization-electric-vehicle-charging, Parts 1-4, Jan. 9, 2020.

Figure 2:
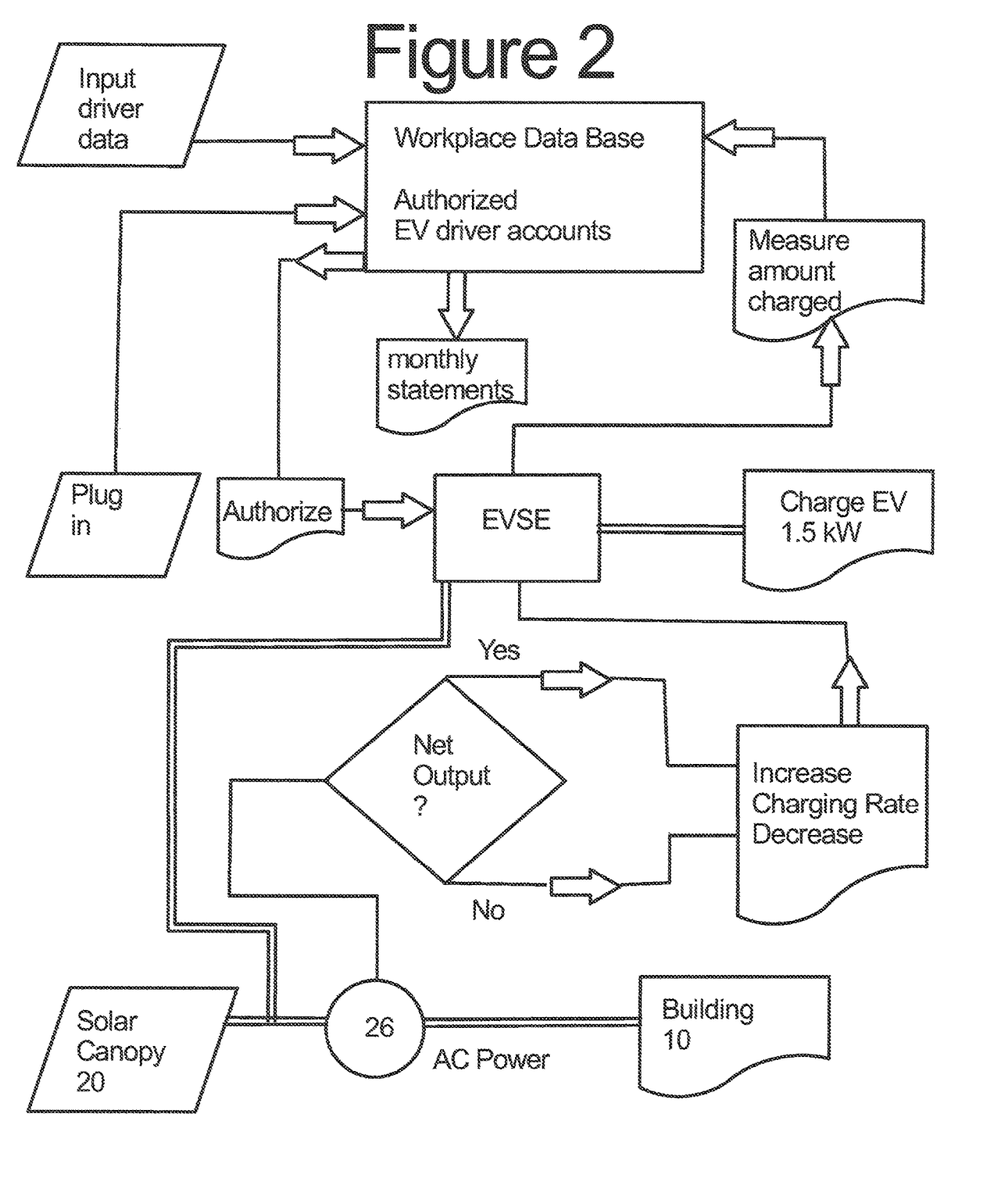
FIG. 2 is a schematic diagram of software used by the system of FIG. 1 to log in authorized users, charge their vehicles and modulate their charging rate based on a continuous evaluation of the amount of solar power available for EV charging.

Software of this invention to authorize workplace charging and perform solar sequencing is shown schematically in FIG. 2. Data on authorized EV drivers is input to a database maintained either in on site controller 28 or by a remote aggregator. The data confirm that the driver is authorized to charge at the location in question, and may assign that driver to a specific parking spot. If a parking agreement is entered into, the details of each account including any charge for energy or monthly use is entered.

When a driver requests service, either by scanning a QR code on the EVSE or by presenting an RFID card, the input is compared with the stored data, and if the driver is found to be properly authorized, the EVSE is turned on and charging begins. Specific driver requests for added range for that day can be input and accommodated.

The primary control on the charging rate will be determined by the availability of solar energy. EVs that are plugged in can be charged at a minimum rate of 1.5 kW, which will keep the EV synchronized with the EVSE. If continued for an eight hour work day with no solar energy input, the minimum 1.5 kW rate will add approximately 50 miles of range to make up for the daily commute and minimal extra driving. On days when significant solar energy becomes available, the rate of EV charging can be ramped up to keep the current through net meter 26 near zero and increase the amount of range imparted to the EVSEs without incurring additional utility charges for either energy or demand. Ultimately individual EVs will reach either preselected levels of State Of Charge (SOC) or full charge at which point they will automatically shut themselves off and terminate charging. Any excess solar energy will then pass through net meter 26 to offset building load and even reduce afternoon demand during the summer months.

Alternatively, the group of EVSEs can be preprogrammed to match expected solar output. For each day of the year there is an anticipated output of the solar canopy. The EVSES as a group can be limited to this level. If the solar energy falls below the predicted level as indicated by net meter 26 the rate of group charging can be reduced to match, subject to the need for a minimum of 1.5 kw to maintain connection and minimum added range for each EV's commute.

At the conclusion of each day's charging session, the data on the amount of energy transferred to each EV is stored in the database and converted at the end of the month to an invoice if required. Substantially more information can be stored by some EVSE networks such as the time history of each charging event and a record of weekly or monthly energy usage.

The network can interrupt or delay charging based on a time-of-use setting. For example, charging can be limited to a time when the building demand is lower than the monthly peak that determines the current level of demand charges as described in detail in Provisional Patent Application 62/978, 381, "Optimum Utilization of Electric Circuit Capacity by Adding Electric Vehicle Charging, [0004] Reference 1. above, which is incorporated herein by reference.

Figure 3:
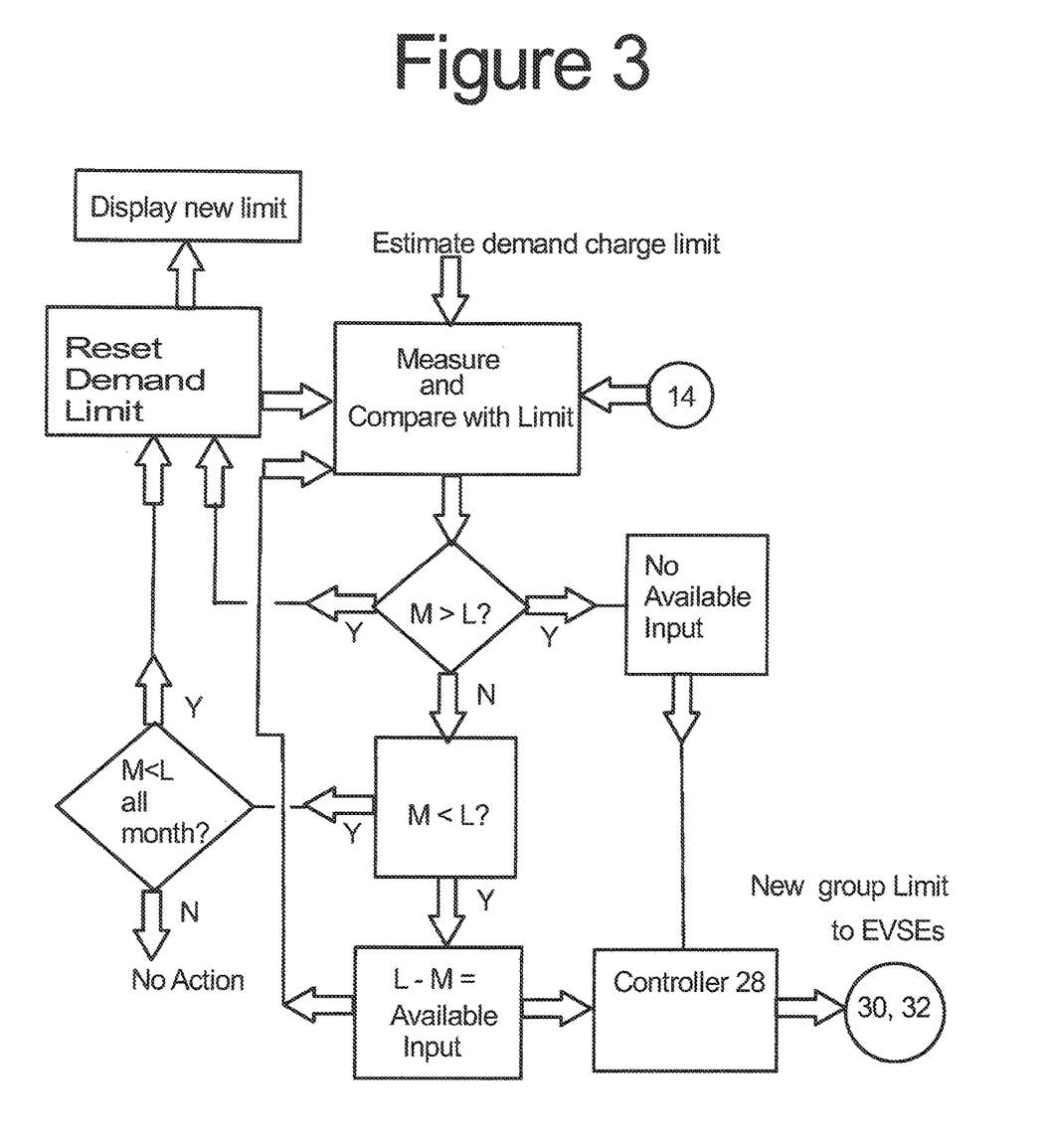
FIG. 3 is a schematic diagram of the software used to keep the EV charging load below the limit at which the monthly demand charge will increase, (similar to FIG. 2 of Reference 1)[4].

FIG. 3 which is redrawn from FIG. 2 of [0004] Reference 1 above is a schematic diagram of the software in controller 28 or at a remote aggregator, which recalculates from month to month a demand charge limit. The program is started with an estimate of the demand charge limit L derived from previous electric bills. This is an estimated maximum demand for the primary loads of building 10 $L_b$, less any estimated excess solar energy S from canopy 2, $L=L_b-S,$ which will determine the demand charge leveled by the electric distribution company as measured by meter 14 in FIG. 1. As long as the demand M measured by meter 14 is lower than the estimated demand charge limit, L, controller 28 sets the limit for the group of EVSEs at the difference between the measured primary demand M and the estimated demand charge limit L. The EVSE cloud-based grouping software then splits up the available EVSE power $A=L-M$ between EVs 30 and 32 which are plugged in ready to charge. In the early morning hours with low primary demand and few EVs plugged in, they may be able to draw maximum power without increasing demand. At other times with more EVs or less power available above the primary needs, the group of EVSEs will share the available power, but in all cases the circuit will be providing the maximum power that can be used at the limiting power that is available, and thus at minimum cost. The result is an increase in the efficiency of utilization of electric energy supply based on the ability of EVs to accept energy at variable rates and variable times without prejudicing the utility of the vehicles.

Controller 28 measures the demand at suitable intervals such as the 15 minutes often used for demand charging. If the measured load is greater than the estimated limit, M>L, the limit will need to be reset upwards because next month's bill will show a higher demand. Also there is no room for EV charging and a signal to that effect is sent to Group 30, 32.

If M is less than L, L>M, two actions are taken. First, the actual M readings are stored in a register for a monthly billing period, and if all M for the month are lower than L the highest M for the month is the new (lower) L for the next month.

Second, L-M is the available power for EV charging, which is transmitted by controller 28 to group 30, 32 as the new group limit. The EVSE group utilizes this available power to recharge the EVs in the most efficient manner. The program then recycles to the next measurement M and comparison of M and L.

Finally the rate of charging can be modulated in response to commands for frequency regulation. Typically electric grid operators need to give or get increments of electric power from second to second to maintain the grid frequency at exactly 60 Hz. There is a well-established market for providing this service in 100 kW increments, and getting paid for it through Curtailment Service Providers (CSPs). The operators qualify both generators and controllable loads, which can provide regulation services. The qualified entities then bid to provide services in the day-ahead market through the CSPs. Accepted bidders receive commands to increase or reduce availability of energy on the grid and are remunerated based on their performance. An aggregation of EVSEs can be controlled remotely to provide this service.

Figure 4:
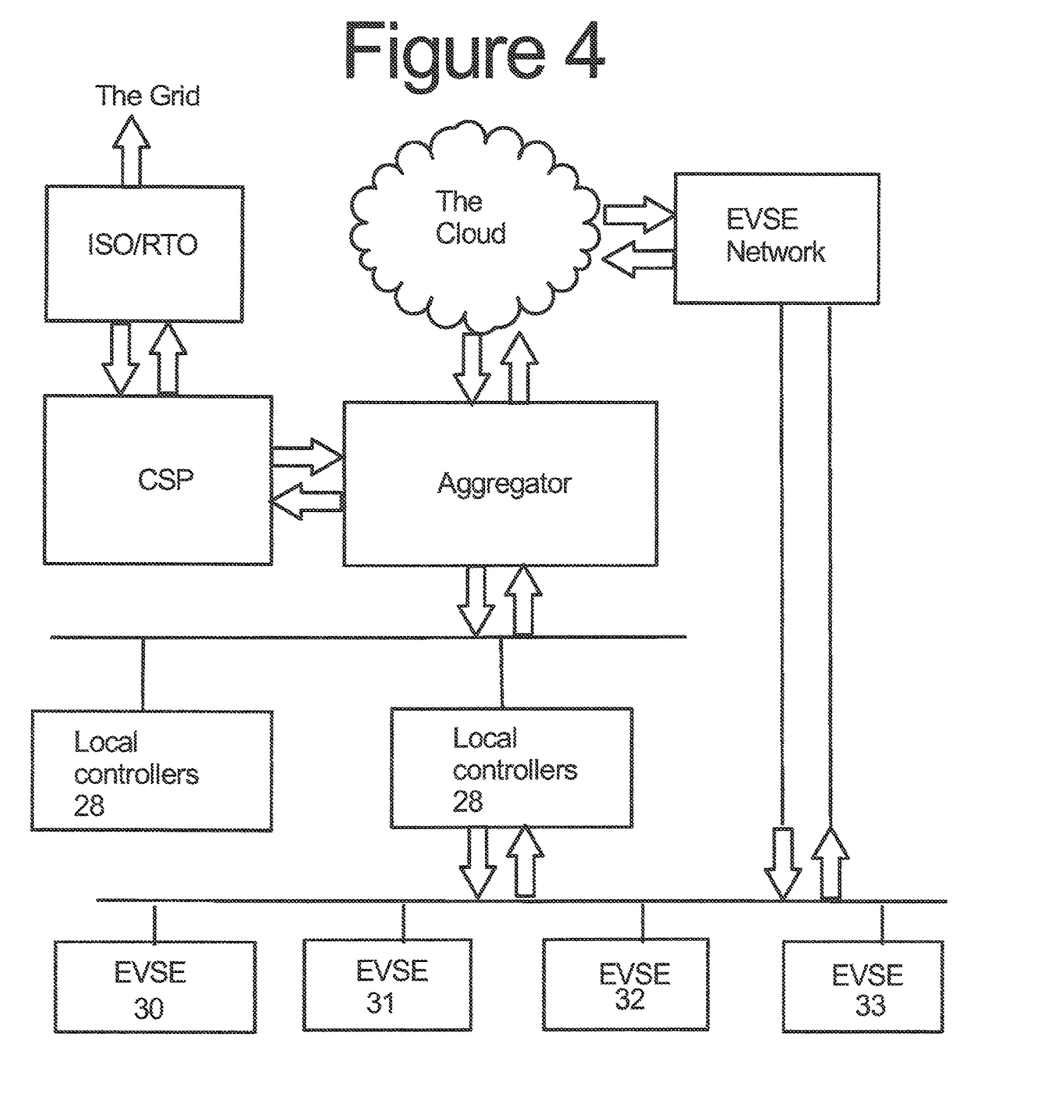
FIG. 4 is a schematic diagram showing the Internet communication paths required to operate this system and to respond to requests for ancillary service (Frequency Regulation) to the grid.

FIG. 4 is a schematic diagram of the communication path from the grid required to control of EVSEs 30, 32 for frequency regulation. The grid is controlled by the local Independent System Operator (ISO) or the Regional Transmission Operator (RTO). The ISO/RTO determines the need from second to second for more or less energy generation to satisfy the load, to keep the frequency at exactly 60 Hz, and the entire system in synchronization. These requirements are passed on to the CSPs who provide regulation service. The aggregators of EV charging bid through a CSP in the day-ahead market to curtail load in response to signals from the ISO/RTO relayed by the CSP through a secure pathway on the Internet. If the bid is accepted, signals to adjust load to a particular value in the bid range, typically at two-second intervals during the hour, are sent by the CSP and relayed by the aggregator to individual groups of EVSEs. This relay can be through local controllers 28 or through the cloud-resident EVSE supplier network. If the EVSEs and the EVs being charged are capable of bidirectional DC current flow, a very significant regulatory effect of tens of kW can be accomplished by each vehicle as long as it is connected. This is Vehicle-to-Grid, or V2G operation. Even one-way flow of energy to the vehicle can be modulated in response to the needs of the grid, (V1G), to provide useful regulation service when aggregated to the minimum increment acceptable to the ISO/RTO.

To confirm that the agreed regulation service has been performed, it is necessary that the communication loop be completed from the individuals EVSEs back through the local controllers or the EVSE network to the aggregators, and on to the CSP and to the ISO/RTO for confirmation.

RELEVANT PREVIOUS LITERATURE

There are a number of references to solar protected carports and solar charging in the literature, and they are available as products. Many of these are for single parking spaces. Empower Solar and Envision with their EV Arc products are typical.

There is a sparse patent literature on this subject Duarte[6] describes a system in which solar energy is generated by a canopy over parking spaces and fed to the grid, which in turn supplies energy to fast charge electric vehicles parked under the canopy. In effect he is proposing to use the grid as a giant storage battery, but this will encounter massive demand charges, which it is a central objective of this invention to prevent.

[6] Patent Application 2013/0127,393, May 23, 2013, "Solar Station for Charging Electric Vehicles", and U.S. Pat. No. 9,236,637, Same title, same inventor, Santos Silva Serra Duarte.

Son[7] discloses comparing the energy requirements of a group of EVs with the availability of renewable energy from one or more sources and matching the two for maximum renewable utilization. This is not the tightly integrated and optimized local system for workplace charging EVs of the present invention.

[7] Patent Application 2015/0306,970", Oct. 29, 2015, Energy Management Method and Energy Management System Using Same", M. Son.

While the drawings and descriptions in this application are intended to be comprehensive, it will be understood by those skilled in the art that there are similar means to achieve the same ends, which fall within the claimed scope of this invention.

I claim:

1. A system comprising:
   one or more solar photovoltaic canopies deployed in a parking lot to receive solar energy and provide electric energy to recharge one or more vehicles,
   one or more inverters to convert DC electric energy produced by the canopies into AC energy,
   one or more Electric Vehicle Service Equipments (chargers) receiving AC energy to recharge said one or more vehicles from the one or more inverters, and from an adjacent source of AC electric energy, which adjacent source of AC electric energy can accept energy from the one or more solar photovoltaic canopies,
   a gross electric energy meter to measure a first total electric energy produced by the one or more solar photovoltaic canopies,
   a net meter to measure energy consisting of the first total electric energy less the energy used for charging said one or more vehicles,
   a meter that can measure the demand on the adjacent source of energy,
   a control system with software to control the charging rate of said one or more vehicles to maximize the use of solar energy to charge the one or more vehicles and minimize the impact of charging said one or more vehicles on said demand, and
   control system software that can identify authorized users of said one or more vehicles, allow them to charge said one or more vehicles and measure the energy used to charge said one or more vehicles.

2. The system of claim 1 in which a local controller containing a microprocessor, transmission/receiver equipment and specialized control software is used to control operation of the EVSE(s).

3. The system of claim 1 in which control functions are performed remotely in the Internet cloud.

4. The system of claim 1 in which control functions are performed remotely based on a network provided by the EVSE manufacturer operating in the Internet cloud.

5. The system of claim 1 in which control is provided remotely by an aggregator of several such systems.

6. The system of claim 1 which is installed at a workplace.

7. The system of claim 1 which is installed at a multi-family residence.

8. A method of installing and operating the system of claim 1 in which, when said one or more vehicles are plugged into the EVSEs and charging is authorized by the control system, they receive a minimum rate of charge that will maintain the communication between the vehicle and the EVSE, which can be increased to provide additional range for the one or more vehicles to the extent that solar energy is available from the canopy.

9. The method of installing and operating the system of claim 8 adjacent to a source of electric energy in which the electric power demand of the adjacent source of energy is continuously measured and the EVSEs are controlled to provide the maximum amount of electric power for recharging that will minimize the total demand and related demand charges.

10. The method of installing and operating the system of claim 8 adjacent to a source of electric energy in which the EVSEs are grouped together to divide an amount of electric energy from said source of electric energy, such that said amount of electric energy will not increase the demand charges on the source of electric energy.

11. The method of installing and operating the system of claim 8 in which individual vehicles of said one or more vehicles can be provided with extra energy to satisfy special needs.

12. The method of installing and operating the system of claim 8 in which data from the system is periodically and automatically converted into reports and billing statements.

13. The method of installing and operating the system of claim 8 in which the rate of charge is modulated in response to requests from the grid ISO/RTO to provide frequency regulation service and revenue.

* * * * *